United States Patent [19]

Roland et al.

[11] 3,915,556

[45] Oct. 28, 1975

[54] Tl$_3$AsS$_4$ CRYSTALS AND ACOUSTO-OPTICAL SYSTEMS

[75] Inventors: George W. Roland, Monroeville; John D. Feichtner, Murrysville; Milton Gottlieb, Pittsburgh, all of Pa.

[73] Assignee: Westinghouse Electric Corporation, Pittsburgh, Pa.

[22] Filed: Dec. 20, 1973

[21] Appl. No.: 427,007

Related U.S. Application Data

[62] Division of Ser. No. 242,986, April 11, 1972, Pat. No. 3,799,659.

[52] U.S. Cl. ............... 350/161; 331/94.5; 332/7.51
[51] Int. Cl.² ......................................... H01S 3/10
[58] Field of Search .......... 331/94.5; 350/160, 161, 350/321; 423/117, 511; 23/295; 252/300; 356/71; 332/7.51; 333/30

[56] References Cited

OTHER PUBLICATIONS

Hawley, Contributions to the Chemistry of Thallium, II, J.A.C.S., Vol. 29, p. 1011, (1907).

*Primary Examiner*—William L. Sikes
*Attorney, Agent, or Firm*—R. D. Fuerle

[57] ABSTRACT

A crystal of Tl$_3$AsS$_4$ having parallel optical faces is used in acousto-optical systems. Sound waves are generated in the crystal by means of a transducer connected to an RF generator and light is directed through optical faces of the crystal where it interacts with the sound waves. The acousto-optical system may be in the form of a display device, a laser modulator, a tunable filter, or other devices. An acoustic delay line using a crystal of Tl$_3$AsS$_4$ is also disclosed.

23 Claims, 4 Drawing Figures

TL$_3$AsS$_4$ CRYSTALS AND ACOUSTO-OPTICAL SYSTEMS

This is a division, of application Ser. No. 242,986 filed April 11, 1972, now U.S. Pat. No. 3,799,659.

BACKGROUND OF THE INVENTION

In 1932 Brillouin discovered that high frequency sound waves can cause diffraction of light and in 1967 R. W. Dixon (IEEE Jour. of Quantum Electronics QE-3, 85, Feb., 1967) discovered that sound waves in crystals of LiNbO$_3$ can cause the plane of polarization of polarized light to rotate. Due to the development of the laser and advances in high frequency acoustic techniques, many applications for these phenomena have been found such as display devices, laser modulators, tunable filters, and acoustic delay lines.

A sound wave in a medium produces alternating compression and rarefaction fronts. The index of refraction in these fronts is different, so that the crystal acts as a diffraction grating, diffracting light which passes through it, the angle of diffraction increasing as the frequency of the sound wave increases, and the amount of light diffracted increasing with the intensity of the sound wave.

There are two modes of diffraction, the Debye-Sears mode and the Bragg mode. The Debye-Sears mode is obtained if the width of the acoustic beam is less than about $\Lambda^2/(4\lambda)$ and the Bragg mode is obtained if the width of the acoustic beam is greater than about $\Lambda^2/4\lambda$ where $\Lambda$ is the acoustic wavelength and $\lambda$ is the light wavelength. In both modes the acoustic wavelength $\Lambda$ must be greater than the light wavelength $\lambda$, and $\lambda$ must, of course, be within the transparency region of the crystal. In the Debye-Sears mode light enters the crystal parallel to the acoustic wave fronts (0° diffracting angle) and is multiply-diffracted into many images or orders of the initial light beam. In the Bragg mode light enters the crystal at the Bragg angle $\phi$ to the acoustic wave fronts where $\sin \phi = \lambda/\Lambda$. In this mode the acoustic wavelength and the Bragg angle are matched to the particular light wavelength, and a single image is diffracted from the crystal at the Bragg angle $\phi$ to the acoustic wave fronts.

A good acoustic-optical material should have a high figure of merit $M_2$, a measurement of the amount of light diffracted for a given amount of acoustic power, where $M_2 = n^6 p^2/\rho v^3$ and n is the refractive index, p is the photoelastic coefficient, $\rho$ is the density, and v is the acoustic velocity. As the formula indicates, a low velocity will give a high figure of merit. Also, a low velocity will give a greater delay per unit length if the crystal is used in a delay line thus permitting acoustic signal processing devices to have smaller physical dimensions. A good acousto-optical material should also have a low acoustic attenuation, allowing a high frequency wave to propagate a long distance before it is absorbed.

PRIOR ART

L. F. Hawley, in 1907 ("Contributions to the Chemistry of Thallium, II" J.A.C.S. 29, 1011) stated that the compound Tl$_3$AsS$_4$ was precipitated when he treated an aqueous solution of xTl$_2$S.yAs$_2$S$_3$ with sodium polysulphide. However, the compound was not prepared as an optically useful crystal and it was not known to have acousto-optical properties.

SUMMARY OF THE INVENTION

We have found that Tl$_3$AsS$_4$ can be grown in large, optically useful crystals. These crystals have lower acoustic velocities and a higher acousto-optical figure of merit for visible and near infrared light than any other prior art material. The crystals have low acoustic losses and high refractive indices. They are optically highly dispersive, with strong dispersion near 6000A leading to large values of the figure of merit for light near 6000A and specifically at 0.6328 $\mu$m, 1.06 $\mu$m, 1.15 $\mu$m, which are convenient and much used laser wavelengths. The crystals have desirable physical characteristics such as resistance to moisture and can be easily grown in optically useful sizes (i.e., greater than 10 cubic millimeters). They are used in acousto-optical systems such as display devices, laser modulators, and tunable filters, and are also used in acoustic delay lines as herein described.

THE CRYSTAL

Figure 1:
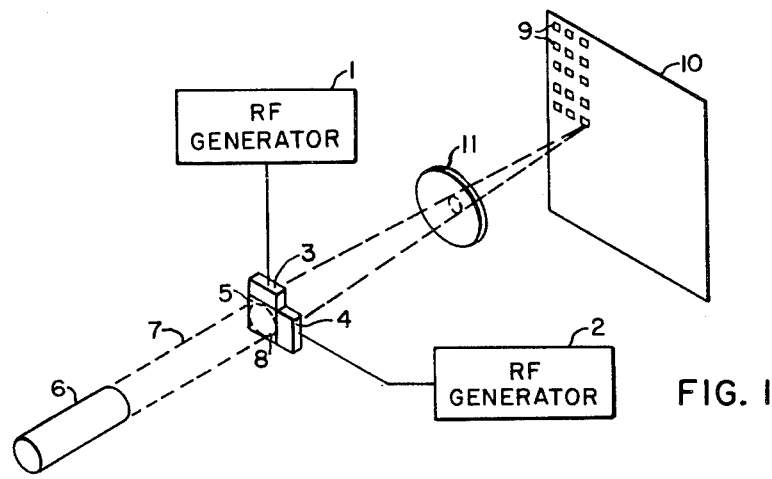
FIG. 1 is an isometric diagrammatic drawing of a display device.

The compound Tl$_3$AsS$_4$ is prepared by melting together stoichiometric quantities of the elements thallium, arsenic, and sulphur. Using the Stockbarger technique a crystal of the compound is prepared by melting the compound and slowly solidifying the melt by lowering it through a two-zone furnace having a steep temperature gradient at the melting point, 417°C ± 3°C. The crystal appears to be stoichiometric within experimental limits. However, it may be desirable to grow crystals which are slightly non-stoichiometric (but within ± 2 percent by weight of each component), in order to relieve stress in the crystal so that larger crystals can be grown; these crystals are contemplated within the scope of the formula Tl$_3$AsS$_4$.

The crystal of this invention is orthorhombic, birefringent, anisotropic, biaxial, and has a density of 6.20 ± 0.04 gms/cc. which gives a cell content of 4(Tl$_3$AsS$_4$). Its Laue class is $2/m\ 2/m\ 2/m$. Of the two permitted space groups, Pcmn and Pc2n, space group Pcmn is more probable based on the observed absence of non-linear optical phenomena. The length of the a axis is about 8.98A, the b axis about 10.8A, and the c axis about 8.86A, and the transparency region is about 0.6 to about 12 $\mu$m.

The following table gives the measured refractive indices of a Tl$_3$AsS$_4$ crystal where $n_a$, $n_b$, and $n_c$ are the refractive indices for light polarized parallel to the a, b, and c axis respectively.

| Wavelength ($\mu$m) | $n_a$ | $n_b$ | $n_c$ |
| --- | --- | --- | --- |
| 0.6328 | 2.829 | 2.774 | 2.825 |
| 0.6943 | 2.774 | 2.721 | 2.770 |
| 0.7490 | 2.738 | — | — |
| 0.8250 | 2.704 | — | — |
| 1.06 | 2.646 | 2.598 | 2.642 |
| 1.15 | 2.634 | 2.580 | 2.626 |
| 1.553 | 2.603 | 2.566 | 2.599 |
| 3.38 | 2.567 | 2.525 | 2.569 |

-Continued

| Wavelength (μm) | $n_a$ | $n_b$ | $n_c$ |
| --- | --- | --- | --- |
| 4.35 | 2.563 | 2.521 | 2.566 |
| 4.47 | 2.560 | 2.518 | 2.563 |
| 5.26 | 2.557 | 2.513 | 2.558 |
| 5.3 | 2.556 | 2.513 | 2.560 |
| 10.6 | 2.542 | 2.498 | 2.541 |

The acoustic properties of the material were measured on an approximately cube shaped sample, 5 mm on a side. The sample was cemented with salol to a fused quartz buffer rod so that the acoustic wave propagated along the crystal c-axis, and the laser beam incident along the b-axis. Using the pulse echo technique at 30 MHz, the shear wave velocity was measured as $1.21 \times 10^5$ cm/sec., and the longitudinal wave velocity as $2.15 \times 10^5$ cm/sec.

Ultrasonic attenuation measurements were done in the frequency range from 30 MHz to 600 MHz, by observing the decrement of the opto-acoustic signal from the first incident pulse in the crystal, and that reflected from the free boundary. Thus, the measured attenuation includes the effects of reflection losses and must be regarded as upper limit values. The attenuation constant reaches a value of 1 db/microsecond at $f = 330$ MHz, and then increases quadratically with frequency, to about 3.5 db/microsecond at 600 MHz.

The acousto-optical figure of merit, $M_2$, is 520 at $\lambda = 0.6328 \mu m$, 330 at $\lambda = 1.15 \mu m$, and 295 at $\lambda = 3.39 \mu m$. The measurement was made by a direct comparison method with fused silica at $\lambda = 0.6328 \mu m$ using the $p_{33}$ component of the photoelastic tensor, i.e. sound wave propagated along the c axis, light polarized parallel to the c axis and propagated normal to the sound wave. From this figure of merit $p_{33}$ was estimated to be 1.96 relative to $p_{31}$ in fused quartz.

The width of the crystal is not critical and several millimeters are typical; however, the optical faces of the crystal should be wider than a laser can be focused (about $10^{-4}$ cm in diameter at the present state of the art), so that light is not wasted. The crystal should not be too thin in the direction of light propagation as this will result in poor interaction between the light and sound and therefore a low intensity diffraction, and if the crystal is too thick light loss due to absorption will be high.

THE SOUND WAVES

The sound wave may be a longitudinal wave, where the particle motion is in the direction of propagation of the wave, or it may be a shear wave, where the particle motion is perpendicular to the propagation direction of the wave, or it may be a combination of both. Preferably, it is either pure shear or pure longitudinal because the two waves travel at different velocities and quickly become out of phase. For delay line applications shear waves are desirable because of their lower velocity. Pure shear waves are generally propagated in a pure shear direction (found experimentally by orientating the crystal) using a shear wave generating transducer such as Y cut or A-C cut quartz, which is bonded to the crystal. Longitudinal waves are obtained by propagating the wave along the c-axis of another pure longitudinal mode direction using a longitudinal wave generating transducer such as X-cut quartz which is bonded to the crystal.

Generally, the Debye-Sears mode is obtained at accoustic frequencies less than about 50 MHz (megahertz) and the Bragg mode at acoustic frequencies greater than about 50 MHz in $Tl_3AsS_4$.

DISPLAY DEVICES

In a display device a light beam is directed at the crystal and the deflected beam which leaves the crystal is directed at some type of viewing screen.

In FIG. 1 RF generators 1 and 2 send RF signals to transducers 3 and 4 respectively which respectively generate vertically moving and horizontally moving sound waves in crystal 5 of $Tl_3AsS_4$, preferably in the Bragg mode so that there is only one diffracted beam. The light, which is preferably collimated, is preferably obtained from laser 6 which generates a coherent beam of light 7 directed at one of the two parallel optical faces 8 of crystal 5. Light passing through crystal 5 is directed at various spots 9 on viewing screen 10 by means of the vertically and horizontally moving sound waves generated by transducers 3 and 4. Lens 11 focuses the light at the spot.

The illuminated spots may each be a page of information which is then optically enlarged and projected on a second viewing screen (not shown). The illuminated spots could also in themselves form a pattern. In either case, visible or infrared light could be used. In the infrared, for example, viewing screen 10 could be a phosphor coated screen such as zinc sulfide doped with lead and copper and flooded with UV light and the successive illumination of selected spots would form a picture similar to a TV picture. Also, in the infrared, viewing screen 10 could be an infrared or thermally quenched UV-excited phosphor screen where ultraviolet light causes the entire screen to be illuminated, but each selected spot successively struck by the beam from crystal 5 is darkened to form a picture on the screen.

LASER MODULATOR

In a laser modulator the acousto-optical system modulates a portion of the output of the lasing medium. A laser modulator could be used, for example, to send signals by means of the fluctuating laser beam intensity.

Figure 2:
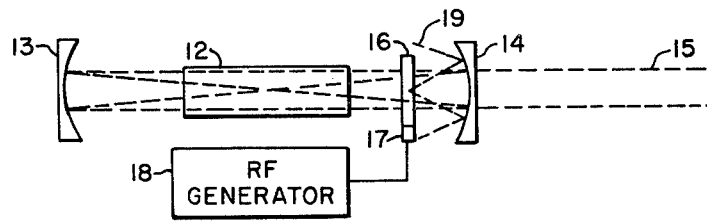
FIG. 2 is a diagrammatic drawing of a laser modulator of the internal configuration.

FIG. 2 shows a laser modulator of the internal configuration. In FIG. 2, lasing medium 12 produces a beam of coherent light which is multiply reflected between mirrors 13 and 14. Mirror 13 totally reflects the light and mirror 14 partially reflects it and partially transmits it as the laser output 15. Interposed between lasing medium 12 and mirror 14 is a crystal 16 of $Tl_3AsS_4$. (The crystal could also be positioned between mirror 13 and the lasing medium). To crystal 16 is affixed a transducer 17 which is electrically connected to an RF generator 18. This generator produces a radio-frequency electrical signal which transducer 17 converts into an acoustic wave which moves through crystal 16 diffracting light as shown at 19.

Figure 3:
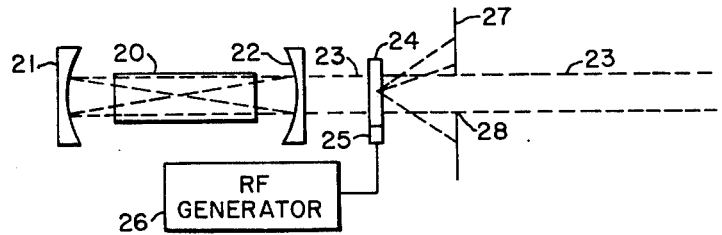
FIG. 3 is a diagrammatic drawing of a laser modulator of the external configuration.

FIG. 3 shows a laser modulator of the external configuration. In FIG. 3 lasing medium 20 produces a beam of coherent light which is multiply reflected between mirror 21, which totally reflects the beam, and mirror 22 which partially reflects the beam and partially transmits it as laser output 23. The laser output 23 strikes crystal 24 of $Tl_3AsS_4$ to which is affixed transducer 25 electrically connected to RF generator 26. Generating a sound wave in the crystal diffracts the laser output causing it to strike screen 27 instead of passing through aperture 28 in the screen.

Large modulation depths can be attained by focusing the laser output 23 into the $Tl_3AsS_4$ crystal in a spot the diameter of which is equal to or less than the sound wavelength $\Lambda$ (a typical spot diameter is about $10^{-2}$ to $10^{-3}$ cm).

ACOUSTIC DELAY LINE

An acoustic delay line causes an electrical signal to be delayed for the length of time required for an acoustic signal to traverse the crystal, L/V, where L is the length of the crystal and V is the acoustic velocity. Unlike many other methods of delaying an electrical signal, an acoustic delay line is non-dispersive.

Figure 4:
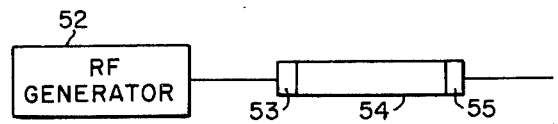
FIG. 4 is a diagrammatic drawing of an acoustic delay line.

In FIG. 4, RF generator 52 provides the electrical signal to be delayed. This signal is electrically transmitted to transducer 53 which converts the signal to an acoustic wave which is propagated through crystal 54 of $Tl_3AsS_4$. At the other end of the crystal transducer 55 detects the acoustic wave and converts it into an electrical signal.

EXAMPLE

The following example further illustrates this invention.

The elements thallium, arsenic, and sulphur were carefully weighed in amounts of 37.5550 grams, 4.5900 grams, and 7.8550 grams, respectively, and sealed under vacuum in a quartz tube. The tube was heated at 600°C for several hours to obtain a homogeneous liquid. It was then cooled to room temperature and the $Tl_3AsS_4$ which had formed was placed in a 12 mm I.D. quartz tube about 14 in. long having a 2 mm I.D. necked portion about 1 in. from the bottom. The tube was then sealed under 0.8 atmospheres of pure argon and passed through a two-zone furnace having a steep temperature gradient (8° to 15°C/mm) at the crystallization point (about 420°) at a rate of about 10 to 15 mm/day. After several days the tube was removed from the furnace, cooled to room temperature, and opened. The crystal, which had grown above the neck of the tube, was given a rough polish, orientated by X-ray diffraction and smoothly polished. Faces were prepared normal to the three crystallographic axes. The crystal dimensions were 15 mm × 6 mm × 4 mm. This crystal and other similarly prepared crystals were used to determine the physical and acousto-optical data previously given.

We claim as our invention:

1. A method of modulating light having a wavelength of about 0.6 to about 13 $\mu$m comprising generating a sound wave in a crystal of $Tl_3AsS_4$ having at least one pair of parallel optical faces, and directing said light through said faces.

2. A method according to claim 1 wherein said crystal is larger than about 10 cubic millimeters.

3. A method according to claim 1 wherein said optical faces are at least $10^{-4}$ cm in diameter.

4. A method according to claim 1 wherein said crystal is capable of exhibiting a Bragg acoustic interaction at acoustic frequencies of less than 600 MHz.

5. A method according to claim 1 wherein said sound wave is a purse shear sound wave.

6. A method according to claim 1 wherein said sound wave is a pure longitudinal sound wave.

7. A method according to claim 1 wherein said light is directed at a viewing screen after it leaves said crystal.

8. A method according to claim 7 wherein two independent sound waves normal to each other and normal to said light are generated in said crystal.

9. A method according to claim 1 wherein the source of said light is a laser comprising a lasing medium and two opposing mirrors.

10. A method according to claim 9 wherein said crystal is positioned between said lasing medium and one of said mirrors.

11. A method according to claim 9 wherein said crystal is positioned external to said laser.

12. An acoustic-optical system comprising
   1. a crystal of $Tl_3AsS_4$ having at least one pair of parallel optical faces;
   2. means for generating a sound wave in said crystal;
   3. a source of light having a wavelength of about 0.6 to about 12 $\mu$m directed through said faces; and
   4. means for detecting at least a portion of said light after it passes through said crystal.

13. An acousto-optical system according to claim 12 wherein said means for detecting said light is a viewing screen.

14. An acousto-optical system according to claim 13 including means for generating two independent sound waves travelling normal to each other and normal to said light in said crystal.

15. An acousto-optical system according to claim 12 wherein the source of said light is a laser comprising a lasing medium and two opposing mirrors.

16. An acoustic-optical system according to claim 15 wherein said crystal is positioned between said lasing medium and one of said mirrors.

17. An acousto-optical system according to claim 15 wherein said crystal is positioned external to said laser.

18. An acousto-optical system according to claim 12 wherein said crystal is larger than about 10 cubic millimeters.

19. An acousto-optical system according to claim 12 wherein said optical faces are at least about $10^{-4}$ cm in diameter.

20. An acousto-optical system according to claim 12 wherein said crystal is capable of exhibiting a Bragg acoustic interaction at acoustic frequencies of less than 600 MHz.

21. An acousto-optical system according to claim 12 wherein said sound wave is a pure shear sound wave.

22. An acousto-optical system according to claim 12 wherein said sound wave is a pure longitudinal sound wave.

23. An acoustic delay line comprising
   1. a crystal of $Tl_3AsS_4$;
   2. means for generating sound waves in said crystal; and
   3. means for detecting sound waves after they have traversed said crystal.

* * * * *